United States Patent [19]
Kinoshita et al.

[11] Patent Number: 5,601,175
[45] Date of Patent: Feb. 11, 1997

[54] LUBRICATION SYSTEM FOR ONE-WAY CLUTCH

[75] Inventors: Yoshio Kinoshita; Hideo Yanagihara, both of Shizuoka-ken, Japan

[73] Assignee: NSK-Warner K.K., Tokyo, Japan

[21] Appl. No.: 551,417

[22] Filed: Nov. 1, 1995

[30] Foreign Application Priority Data

Nov. 1, 1994 [JP] Japan .................................. 6-304164

[51] Int. Cl.$^6$ ........................................................ F16D 13/74
[52] U.S. Cl. .................... 192/113.32; 192/45.1; 188/82.84; 188/264 D; 384/474
[58] Field of Search ............... 192/113.32, 113.3, 192/45.1; 188/82.1, 82.84, 264 D; 384/470, 474

[56] References Cited

U.S. PATENT DOCUMENTS

| | | | |
|---|---|---|---|
| 4,792,028 | 12/1988 | Nishimura et al. | 192/45.1 X |
| 4,875,564 | 10/1989 | Leitz et al. | 192/45.1 |
| 4,913,271 | 4/1990 | Kinoshit et al. | 192/113.32 |
| 4,961,486 | 10/1990 | Kinoshita et al. | 192/113.32 |
| 5,042,628 | 8/1991 | Malecha | 192/45 |
| 5,052,518 | 10/1991 | Trommer | 192/113.32 |
| 5,076,408 | 12/1991 | Numata et al. | 192/113.32 |
| 5,139,123 | 8/1992 | Rutke | 192/45.1 |
| 5,183,139 | 2/1993 | Malecha | 192/45.1 X |
| 5,320,204 | 6/1994 | Riggle et al. | 192/45.1 |

FOREIGN PATENT DOCUMENTS 63-101336  7/1988  Japan .
1-108423  4/1989  Japan .

*Primary Examiner*—Andrea L. Pitts
*Attorney, Agent, or Firm*—Evenson, McKeown, Edwards & Lenahan

[57] ABSTRACT

An end bearing for a one-way clutch is disclosed. The end bearing is provided in its inner or outer peripheral wall with at least one lube oil groove which is oblique to a central axis of the one-way clutch to introduce a lube oil into the one-way clutch. The lube oil groove is formed with varied widths, depths and/or shapes in cross-section from an outer opening on a side opposite to clutch members to an inner opening on a side of the clutch members.

8 Claims, 6 Drawing Sheets

LUBRICATION SYSTEM FOR ONE-WAY CLUTCH

BACKGROUND OF THE INVENTION

1. Field of the Invention

This invention relates to a lubrication system for a one-way clutch.

2. Description of the Related Art

Among one-way clutches which can transmit rotating force in only one direction but idle in the opposite direction, so-called sprag or roller one-way clutches are widely used these days. In such a sprag or roller one-way clutch, clutch members such as sprags or rollers are arranged between an inner ring and an outer ring and are guided at both side walls thereof by end bearings, respectively, so that the clutch members engage the outer and inner rings upon transmission of rotating force but undergo sliding upon idling.

The fundamental construction of a one-way clutch is illustrated in FIG. 7, in which there are shown the one-way clutch 10, clutch members 11, left and right end bearings 12L, 12R, an inner ring 1, an outer ring 2, oilways 3,3' for introducing a lube oil into the one-way clutch, a presser plate (spacer) 4 for limiting the position of the one-way clutch in an axial direction, a stop ring 5, and a central axis X—X.

In a one-way clutch, clutch members repeatedly undergo engagement with an inner and outer rings and sliding due to idling. Substantial heat generation and friction therefore occur unless sufficient lubrication is applied. Further, it is also necessary to supply a lube oil sufficiently to avoid irregular rotation and/or seizure because end bearings are usually sliding bearings.

For this purpose, the one-way clutch is provided at mounting portions therefor with special lube oil passages like the oilways 3,3' in the inner and outer rings as shown in FIG. 7.

However, the arrangement of oilways as lube oil passages inside a power transmission mechanism of a complex construction as described above requires by itself complex machining and members provided with the oilways, such as an inner ring and an outer ring, are reduced in strength. Further, clutch members trample under a high bearing pressure the oilways open in raceway surfaces upon coupling of the one-way clutch. The oilways may therefore become as origins for the propagation of flaking and/or cracking, resulting in the problem that the raceway surfaces may be deteriorated.

To cope with this problem, it is often required to increase the thicknesses of the inner and outer rings and/or to use an expensive material for the inner and outer rings. These requirements however lead to improper deformation in heat treatment or the like, thereby necessitating complex treatment and machining.

It was hence proposed to arrange helical lube oil grooves open in relatively-rotating opposing walls of an inner or outer ring and an end bearing or presser plate instead of formation of oilways in peripheral members such as an inner and outer rings and then to make the helical lube oil grooves produce pumping action under the relative rotation to introduce a lube oil into a one-way clutch.

In each of FIGS. 6A and 6B, end bearings are indicated by numeral 12 (the left and right end bearings are designated at symbols 12L,12R, respectively), a central space with clutch members accommodated therein by letter C, a left-hand outer space by letter L, a right-hand outer space by letter R, an inner peripheral wall of each end bearing by numeral 121, and an outer peripheral wall of each end bearing by numeral 122. Each inner peripheral wall 121 is provided with helical oil grooves 123.

In FIG. 6A, the left and right end bearings 12L, 12R are provided with helical oil grooves 123A,123B both extending in a single common direction. In FIG. 6B, however, the helical oil grooves 123A in the left end bearing 12L and the helical oil grooves 123B in the right end bearing 12R are different in helically-winding direction from each other.

Since the left and right end bearings 12L,12R in FIG. 6A are of the same shape, end bearings of the same design can be used commonly as these bearings 12L,12R.

When the one-way clutch rotates in one direction in FIG. 6A, the oil flows from L to C as indicated by arrow $D_1$ in the case of the end bearing 12L. Since the direction of each helical groove is the same in the end bearing 12R, the oil flows in the same direction as the arrow $D_1$, that is, from C to R as indicated by arrow $D_3$ in the case of the end bearing 12R.

In the case of a specification in which the direction of rotation is opposite, on the other hand, the direction of a flow of the oil becomes opposite as indicated by arrow $D_2$ in the case of the end bearing 12L or by broken-line arrow $D_4$ in the case of the end bearing 12R.

As is understood from the foregoing, inward flowing of the oil from L into C as indicated by arrow $D_1$ is therefore accompanied by concurrent outward flowing of the oil from C to R as indicated by arrow $D_3$. When the one-way clutch is rotating in the opposite direction, the oil flows in from R into C but at the same time, flows out from C to L as indicated by broken-line arrow $D_2$. The space C in which the clutch members are accommodated cannot accordingly be filled with the lube oil.

FIG. 6B is a schematic illustration of flows of an oil when the left end bearing 12L and the right end bearing 12R are provided with helical oil grooves which are indicated at 123A,123B, respectively, and are different in helically-winding direction. When the one-way clutch is rotating in one direction, the oil flows from L into C as indicate by arrow $D_1$ in the case of the end bearing 12L, and in the case of the end bearing 12R, the helical oil grooves 123B are opposite in helically-winding direction so that the oil flows from R into C as indicated by arrow $D_5$.

In the case of a specification in which the direction of rotation of the one-way clutch is opposite, on the other hand, the direction of flows of the oil becomes opposite as indicated by broken-line arrows $D_2$ and $D_6$, respectively, so that the oil flows out from C to L in the case of the end bearing 12L and also from C to R in the case of the end bearing 12R.

As is appreciated from the foregoing, in the one-way clutch illustrated in FIG. 6B, the lube oil, depending on the direction of rotation, only flows into C from L and R or only flows out from C to L and R through both the end bearings 12L,12R. An oilway is therefore needed for discharging or feeding the lube oil, resulting in the drawback that the strength of the shaft is reduced.

SUMMARY OF THE INVENTION

An object of the present invention is to provide a lubrication system for a one-way clutch, which can sufficiently feed a lube oil to clutch members to obtain cooling and sufficient lubrication.

In one aspect of the present invention, there is thus provided a lubrication system for a one-way clutch. The system includes plural lube oil grooves formed obliquely to a central axis of said one-way clutch in an inner or outer peripheral wall of an end bearing to introduce a lube oil into said one-way clutch. The lube oil grooves are each formed with varied widths, depths and/or shapes in cross-section from an outer opening on a side opposite to clutch members to an inner opening on a side of said clutch members so that a difference is produced between an amount of the lube oil, which is to be allowed to flow in to the side of said clutch members from said outer opening via said inner opening owing to pumping action of said lube oil groove, and another amount of the lube oil to be allowed to flow out from said outer opening via said inner opening.

In another aspect of the present invention, there is also provided an end bearing for a one-way clutch. The end bearing is provided in an inner or outer peripheral wall thereof with at least one lube oil groove oblique to a central axis of said one-way clutch to introduce a lube oil into said one-way clutch. The lube oil groove is formed with varied widths, depths and/or shapes in cross-section from an outer opening on a side opposite to clutch members to an inner opening on a side of said clutch members.

In a further aspect of the present invention, there is also provided a lubrication system for a one-way clutch. The system includes plural lube oil grooves formed obliquely to a central axis of said one-way clutch in an inner or outer peripheral wall of an end bearing to introduce a lube oil into said one-way clutch. The lube oil grooves are each formed so that a difference is produced between an amount of the lube oil, which is to be allowed to flow in to a side of clutch members from an outer opening on a side opposite to said clutch members via an inner opening on a side of said clutch members owing to pumping action of said lube oil groove, and another amount of the lube oil to be allowed to flow out from said outer opening via said inner opening.

According to the present invention, the amount of the lube oil flowing into a clutch portion, in which the clutch members are accommodated, is greater than the amount of the lube oil flowing out of the clutch portion. Therefore, the clutch portion is always fully filled with the lube oil so that cooling and sufficient lubrication can be obtained.

Where sufficient lube oil flows into the clutch portion through another route, the amount of the lube oil which flows out of the clutch portion can be increased. This accelerates the circulation of the lube oil through the clutch portion, thereby enhancing the cooling effect.

Further, it is possible to make identical the design of both left and right end bearings. In this case, end bearings of the same design can be commonly used as the left and right end bearings, respectively.

DETAILED DESCRIPTION OF THE INVENTION AND PREFERRED EMBODIMENTS

Figure 1:
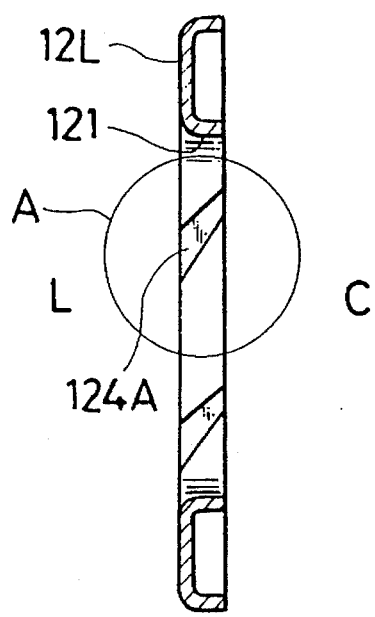
FIG. 1 is a cross-sectional view of an end bearing according to a first embodiment of the present invention, in which lube oil grooves are formed in the same direction.

Referring first to FIG. 1, the end bearing according to the first embodiment of the present invention will be described. Symbol 124A indicates a lube oil groove formed in an inner peripheral wall 121 of the end bearing 12L. Designated at letter L is an outer space on a left-hand side of the end bearing 12L, whereas designated at letter C is an inner space on a right-hand side, that is, on a side of clutch members.

Figure 3A:
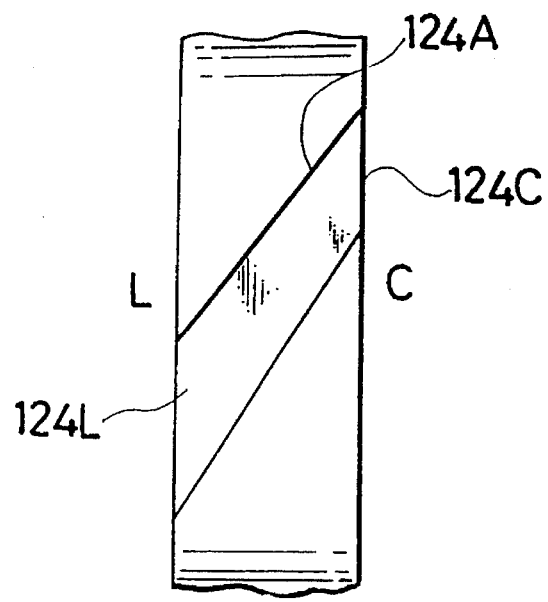
FIG. 3A is an enlarged view of a portion A in FIG. 1.
Figure 3B:
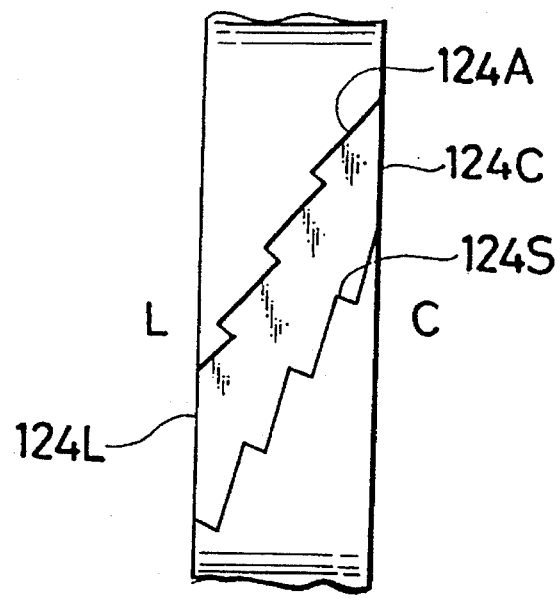
FIGS. 3B through 3D are similar to FIG. 3A but illustrate modifications of the lube oil groove.
Figure 3C:
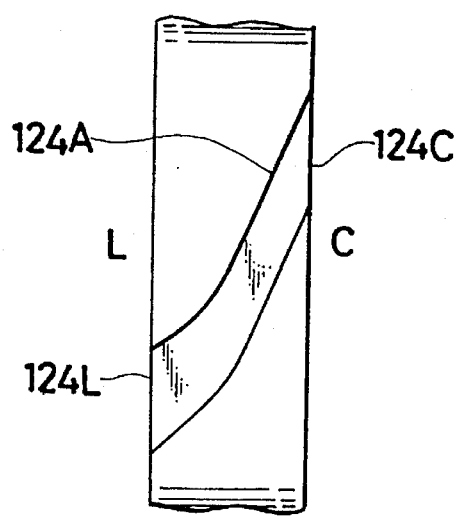
Figure 3D:
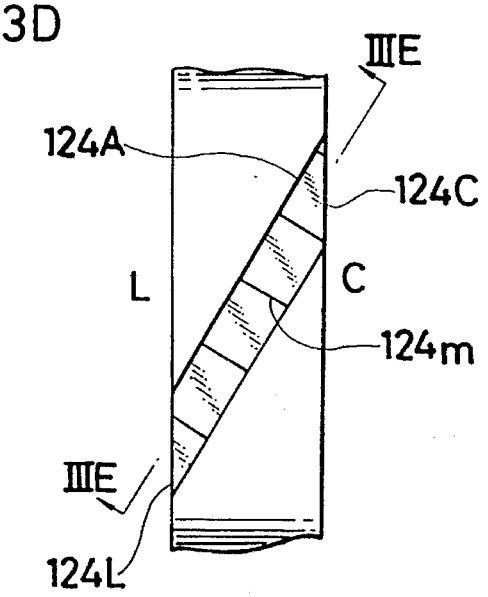

The portion A (groove 124A) in FIG. 1 is shown on an enlarged scale in FIG. 3A. FIGS. 3B through 3D depict various modifications of the groove 124A. In each of these drawings, the left-hand side of the groove 124A corresponds to the left-hand space L while the right-hand side of the groove 124A corresponds to the inner space C, that is, on the side of the clutch members, and an outer opening on the side of the outer space L is indicated at symbol 124L while an inner open on the side of the inner space C is designated at symbol 124C.

In the example of FIG. 3A, the width of the groove 124A progressively becomes narrower from 124L to 124C. A flow rate from L toward C is therefore greater than a flow rate from C toward L.

In the example of FIG. 3B, the groove has a portion 124S in the form of a Christmas tree where the width progressively becomes narrower from L toward C. A flow from C toward L therefore encounters greater resistance, resulting in a smaller flow rate.

In the example of FIG. 3C, the groove 124A shown in FIG. 3A is bent at an intermediate point.

Figure 3E:
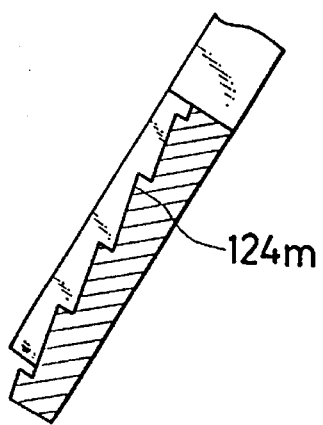
FIG. 3E is a cross-sectional view taken in the direction of arrows IIIE—IIIE of FIG. 3D.

In the example of FIG. 3D, the groove 124A has a bottom wall of a saw-tooth profile 124m. FIG. 3E is a cross-sectional view taken in the direction of arrows IIIE—IIIE of FIG. 3D, that is, along a center line of the groove 124A in FIG. 3D.

As is understood from FIG. 3E, the bottom wall of the groove 124A is in the form of the saw-tooth profile 124m which rises in the direction from L toward C. A flow from C toward L therefore encounters greater resistance, resulting in a smaller flaw rate.

Figure 2:
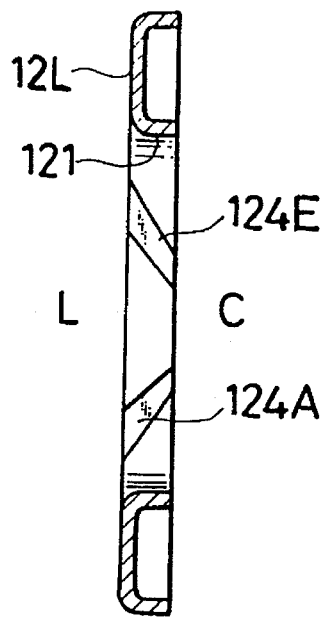
FIG. 2 is a cross-sectional view of an end bearing according to a second embodiment of the present invention, in which lube oil grooves are formed in opposite directions.

In the second embodiment of the present invention as shown in FIG. 2, an inner peripheral wall 121 of the end bearing 12L is provided with lube oil grooves 124A,124E. The helically-winding directions of these lube oil grooves 124A,124E are opposite to each other.

Figure 4:
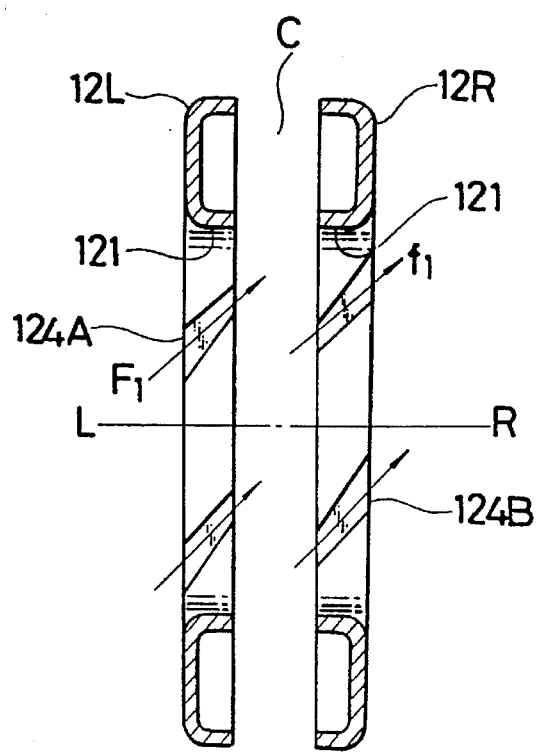
FIG. 4 is a schematic view illustrating action of end bearings according to the first embodiment of the present invention.

With reference to FIG. 4, the action of end bearings according to the first embodiment of the present invention will be described. The end bearings 12L,12R are provided in their inner peripheral walls with lube oil grooves 124A, 124B, respectively. The helically-winding directions of these lube oil grooves 124A,124B are the same. Each of these lube oil grooves 124A,124B is shaped so that the flow rate of a flow from the side of the outer opening toward the side of the inner opening becomes greater. The left-hand side of the end bearing 12L is the outer space L, the space between the end bearings 12L and 12R is the inner space C in which the clutch members are accommodated, and the right-hand side of the end bearing 12R is the outer space R.

Now assume that upon rotation of the one-way clutch, the lube oil is caused to flow as indicated by arrows $F_1,f_1$ in FIG. 4. Since the lube oil grooves 124A,124B are shaped to satisfy the relationship of $F_1>f_1$ as described above, the lube oil is adequately circulated while always filling the inner space C with the lube oil.

In the case of a specification in which the direction of rotation is opposite, the direction of a flow through each of the lube oil grooves 124A,124B is reversed so that a greater amount of the lube oil flows in from the outer space R to the inner space C but a smaller amount of the lube oil flows out from the inner space c to the outer space L.

Figure 5:
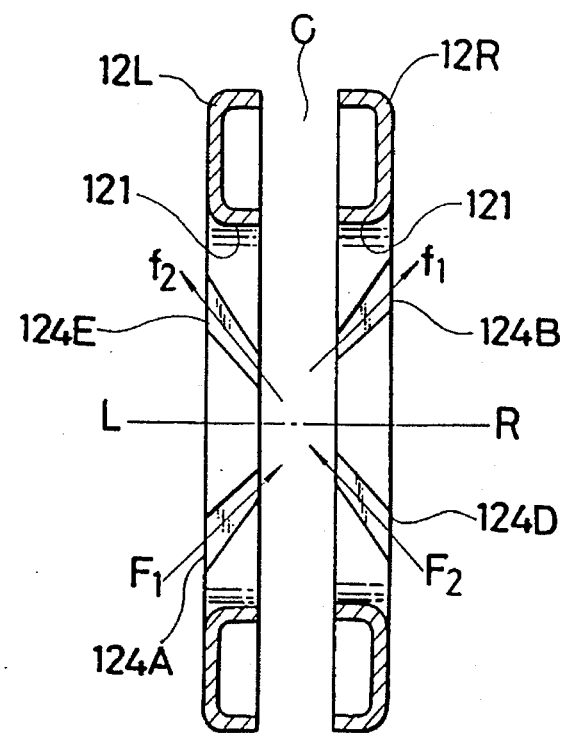
FIG. 5 is a schematic view showing action of end bearings according to the second embodiment of the present invention.
Figure 6A:
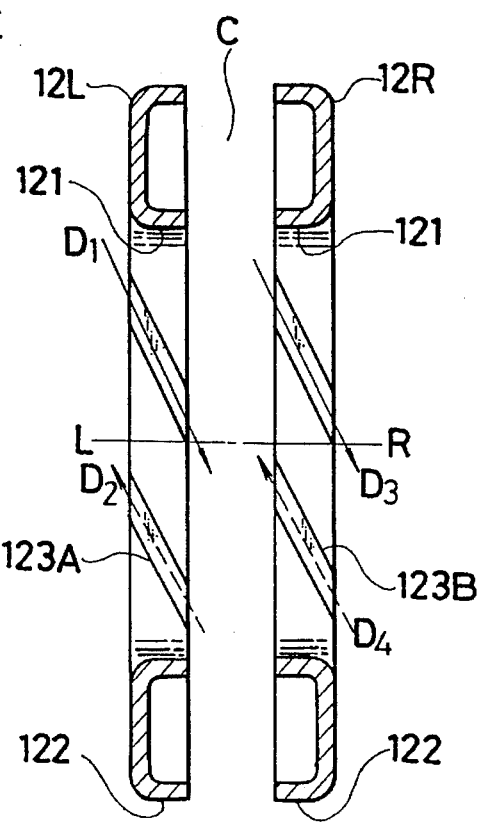
FIG. 6A is a schematic view illustrating action of helical lube oil grooves formed in the same direction.
Figure 6B:
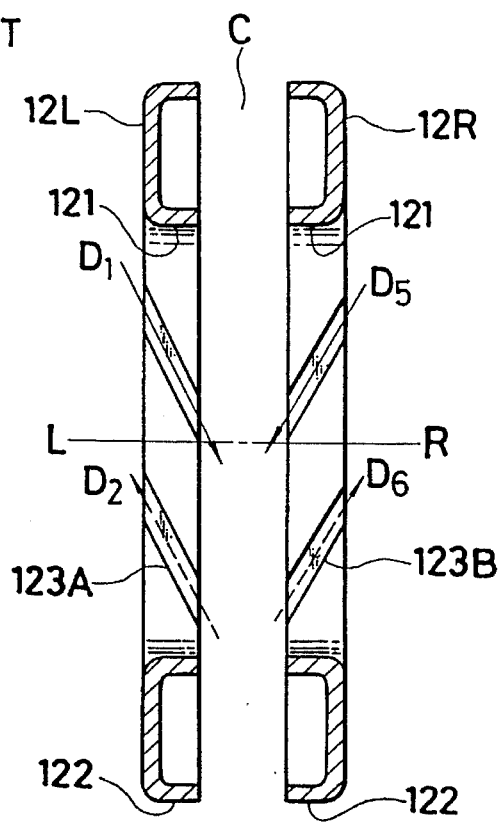
FIG. 6B is a schematic view depicting action of helical lube oil grooves formed in opposite directions.
Figure 7:
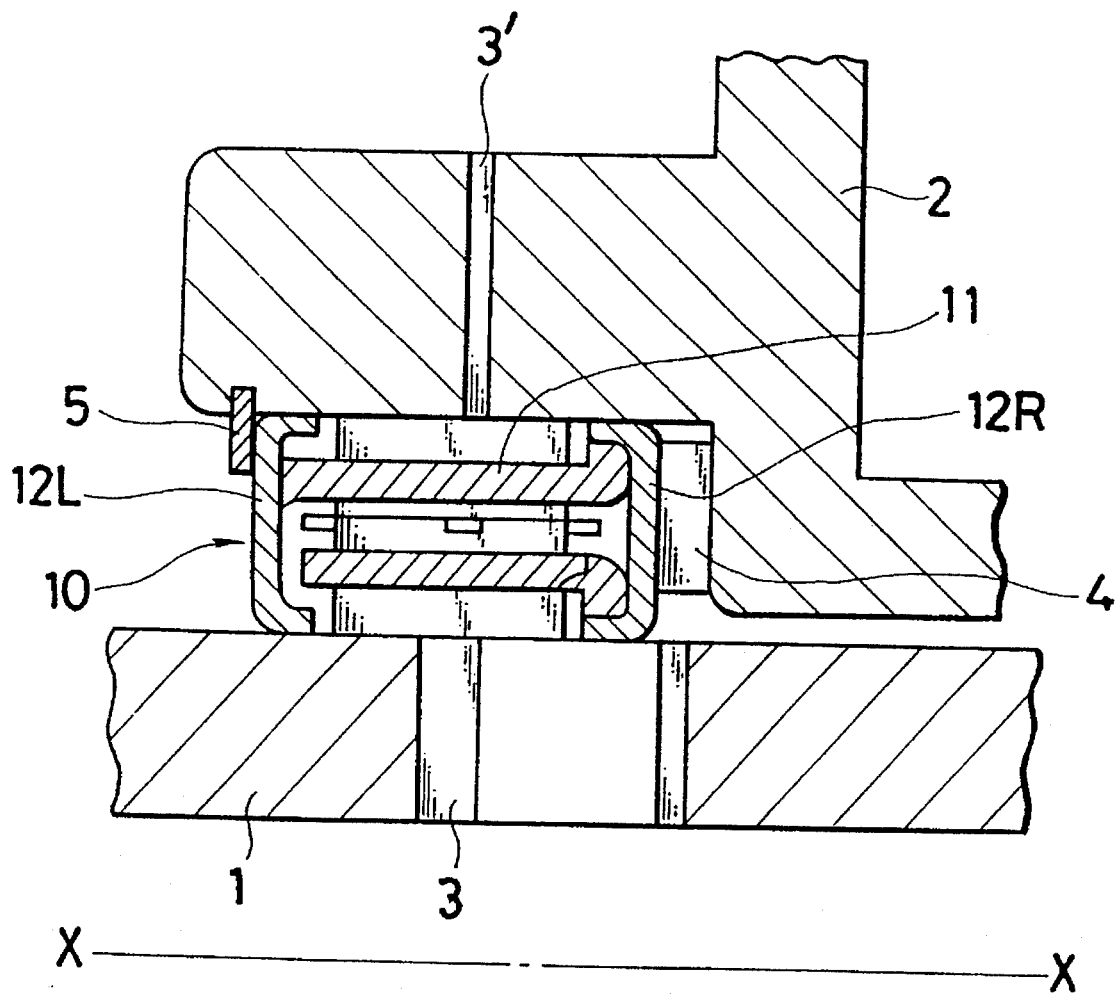
FIG. 7 is a fragmentary cross-sectional view showing the mechanism of a one-way clutch.

Referring next to FIG. 5, the action of end bearings according to the second embodiment of the present invention will be described. The end bearings 12L is provided in its inner peripheral wall with lube oil grooves 124A,124E, whose helically-winding directions are opposite to each other. On the other hand, the end bearings 12R is provided in its inner peripheral wall with lube oil grooves 124B,124D, whose helically-winding directions are opposite to each other. As in the case of FIG. 4, each of the lube oil grooves 124A,124E,124B,124D provides a greater flow rate when the lube oil flows in the direction of from L or R to C.

Upon rotation of the one-way clutch, the lube oil flows as indicated by arrows $F_1,f_2$ through the end bearing 12L and as indicated by arrows $F_{22},f_1$ through the end bearing 12R. Since the flow rates in the directions $F_1,F_2$ are greater than those in the directions $f_1,f_2$, the lube oil is adequately circulated while always the inner space C with the lube oil.

In the case of a specification in which the direction of rotation is opposite, greater amounts of the lube oil flow in toward the inner space C through the lube oil grooves 124E,124B, respectively, while smaller amounts of the lube oil flow out of the inner space C through the lube oil grooves 124A,124D, respectively.

As is understood from the foregoing, the lube oil is allowed to flow in and out through both the left and right, end bearings 12L,12R irrespective of the direction of rotation of the one-way clutch in the second embodiment.

When the lube oil sufficiently flows in to the side of the clutch members through an oilway or the like, the lube oil grooves can be shaped so that their pumping action is reversed to cause more lube oil to flow out from the side of the clutch members. This makes it possible to more promptly replace the lube oil around the clutch members so that the cooling effect can be enhanced.

In each of the first and second embodiments, the left and right end bearings 12L,12R have the same shape. Therefore, end bearings according to the first or second embodiment can be commonly used as the left and right end bearings 12L,12R.

In the end bearing 12L of the first embodiment shown in FIGS. 1 and 4, both the lube oil grooves 124A are formed at the same inclination relative to the central axis of the one-way clutch. These lube oil grooves 124A may however be formed at different inclinations relative to the central axis of the one-way clutch. This applies equally to the right end bearing 12R of the first embodiment depicted in FIG. 4.

In FIGS. 2 and 5, the lube oil grooves 124A,124E in the left end bearing 12L of the second embodiment are formed at the same inclination relative to the central axis of the one-way clutch although they extend in opposite directions. The lube oil grooves 124A,124E may however be formed at different inclinations relative to the central axis of the one-way clutch. This applies equally to the right end bearing 12R of the second embodiment shown in FIG. 5.

What is claimed is:

1. In a lubrication system for a one-way clutch, said system including plural lube oil grooves formed obliquely to a central axis of said one-way clutch in an inner or outer peripheral wall of an end bearing to introduce a lube oil into said one-way clutch, the improvement wherein said lube oil grooves are each formed with varied widths, depths and/or shapes in cross-section from an outer opening on a side opposite to clutch members to an inner opening on a side of said clutch members so that a difference is produced between an amount of the lube oil, which is to be allowed to flow into the side of said clutch members from said outer opening via said inner opening owing to pumping action of said lube oil groove, and another amount of the lube oil to be allowed to flow out from said outer opening via said inner opening.

2. A lubrication system according to claim 1, wherein said lube oil grooves formed in said end bearing are oblique to said Central axis in the same direction selected from right-hand threads or left-hand threads; and the number and flow-rate difference characteristics of said lube oil grooves are determined in combination so that the amount of the lube oil to be allowed to flow into the side of said clutch members from said outer opening becomes greater than the amount of the lube oil to be allowed to flow out from said outer opening via said inner opening.

3. A lubrication system according to claim 1, wherein said lube oil grooves formed in said end bearing consist of at least one lube oil groove oblique to said central axis in the direction of right-hand threads and the remainder oblique to said central axis in the direction of left-hand threads; and the number and flow-rate difference characteristics of said lube oil grooves are determined in combination so that the amount of the lube oil to be allowed to flow into the side of said clutch members from said outer opening becomes greater than the amount of the lube oil to be allowed to flow out from said outer opening via said inner opening.

4. A lubrication system according to claim 1, wherein the amount of the lube oil to be allowed to flow in to the side of said clutch members from said outer opening is smaller than the amount of the lube oil to be allowed to flow out from said outer opening via said inner opening.

5. A lubrication system according to claim 1, wherein two end bearings are arranged on axially opposite sides of said clutch members, respectively; and said end bearings on said opposite sides are of the same design.

6. An end bearing for a one-way clutch, said end bearing being provided in an inner or outer peripheral wall thereof with at least one lube oil groove oblique to a central axis of said one-way clutch to introduce a lube oil into said one-way clutch, the improvement wherein said lube oil groove is formed with varied widths, depths and/or shapes in cross-section from an outer opening on a side opposite to clutch members to an inner opening on a side of said clutch members.

7. In a lubrication system for a one-way clutch, said system including plural lube oil grooves formed obliquely to a central axis of said one-way clutch in an inner or outer peripheral wall of an end bearing to introduce a lube oil into said one-way clutch, the improvement wherein said lube oil grooves are each formed so that a difference is produced between an amount of the lube oil, which is to be allowed to flow into a side of clutch members from an outer opening on a side opposite to said clutch members via an inner opening on a side of said clutch members owing to pumping action of said lube oil groove, and another amount of the lube oil to be allowed to flow out from said outer opening via said inner opening.

8. A lubrication system according to claim 7, wherein said lube oil grooves are formed at different inclinations relative to said central axis of said one-way clutch.

* * * * *